United States Patent [19]

Buechele et al.

[11] Patent Number: 5,933,910
[45] Date of Patent: *Aug. 10, 1999

[54] RETAINER CLIP FOR WINDSHIELD WIPER REFILL

[75] Inventors: Franz Buechele, Lawrenceburg; Defford Dale Hardee, Jr., Columbia, both of Tenn.

[73] Assignee: ACD Tridon Inc., Burlington, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/936,519

[22] Filed: Sep. 24, 1997

[51] Int. Cl.⁶ .................................................. B60S 1/38
[52] U.S. Cl. .................................. 15/250.454; 15/250.451
[58] Field of Search ....................... 15/250.454, 250.453, 15/250.452, 250.48, 250.451, 250.361

[56] References Cited

U.S. PATENT DOCUMENTS

| | | | |
|---|---|---|---|
| 3,083,394 | 4/1963 | Scinta | 15/250.454 |
| 3,769,653 | 11/1993 | Lopez | 15/250.454 |
| 3,879,794 | 4/1975 | Roberts, Jr. | 15/250.454 |
| 3,885,265 | 5/1975 | Deibel et al. | 15/250.454 |
| 3,919,736 | 11/1975 | Bourassa et al. | 15/250.454 |
| 4,156,951 | 6/1979 | Sharp | 15/250.454 |
| 4,388,742 | 6/1983 | Kimber et al. | 15/250.454 |
| 4,442,566 | 4/1984 | Sharp | 15/250.454 |
| 4,501,043 | 2/1985 | Plisky | 15/250.454 |
| 4,566,147 | 1/1986 | Baerenwald et al. | 15/250.454 |
| 4,679,276 | 7/1987 | Tomkin | 15/250.454 |
| 5,052,072 | 10/1991 | Chen | 15/250.454 |
| 5,493,750 | 2/1996 | Bollen et al. | 19/250.452 |

FOREIGN PATENT DOCUMENTS 2036547  7/1980  United Kingdom ............. 15/250.453

*Primary Examiner*—Gary K. Graham

[57] ABSTRACT

A retainer clip comprising a hollow body or cap for receiving the end portion of an associated backing strip. The body is formed with flanges which locate in respective grooves of the backing strip. Legs with a latch portion to locate a claw termination of a windshield wiper superstructure extend from the flanges in a longitudinal direction and are also received in the longitudinally-extending grooves of the backing strip.

6 Claims, 5 Drawing Sheets

RETAINER CLIP FOR WINDSHIELD WIPER REFILL

FIELD OF THE INVENTION

This invention relates to a windshield wiper and, more particularly, to a retainer clip of the kind which is disposed at one end of a wiper refill comprising a squeegee and backing strip to prevent the squeegee so that the squeegee from sliding out of the backing strip and also to anchor the end claws of a wiper superstructure to the wiper refill.

BACKGROUND OF THE INVENTION

Retainer clips for windshield wiper refills are widely used and their functions are well known. In conventional backing strips, laterally-spaced longitudinally-extending grooves are provided to locate the claws of the associated wiper superstructure and the bead of the squeegee is accommodated in a central slot or opening formed between the grooves. A flat-topped web which forms the connection between the grooves and the slot defines a bearing surface for a retainer clip.

In order to accommodate slender wiper profiles in which the claws of the wiper superstructure are closer together, Applicant developed a "narrow gauge" refill in which the slot for the bead of the squeegee is disposed above the longitudinally-extending grooves so that only the narrow neck portion of the squeegee needs to be accommodated between the grooves. The selected profile for the resulting backing strip, shown in U.S. Design Pat. No. D 365,320, does not have a flat-topped web and therefore cannot be used with conventional retainer clips.

Applicant has accordingly developed a new retainer clip for use with the afore-mentioned backing strip and which has advantageous features for use with conventional backing strips.

SUMMARY OF THE INVENTION

In accordance with the invention, there is provided a retainer clip comprising a hollow body or cap for receiving the end portion of an associated backing strip. The body is formed with flanges which locate in respective grooves of the backing strip. Legs with a latch portion to locate a claw termination of a windshield wiper superstructure extend from the flanges in a longitudinal direction and are also received in the longitudinally-extending grooves of the backing strip.

Optionally, the retainer clip may be provided with a dart in the body to bear against the underlying web of a backing strip and tabs may be provided to obstruct the slot through which the squeegee is received in use.

BRIEF DESCRIPTION OF THE DRAWINGS

In order that the invention may be more clearly understood, a preferred embodiment is described below with reference to the accompanying drawings, in which.

DESCRIPTION OF PREFERRED EMBODIMENT WITH REFERENCE TO THE DRAWINGS

Figure 1:
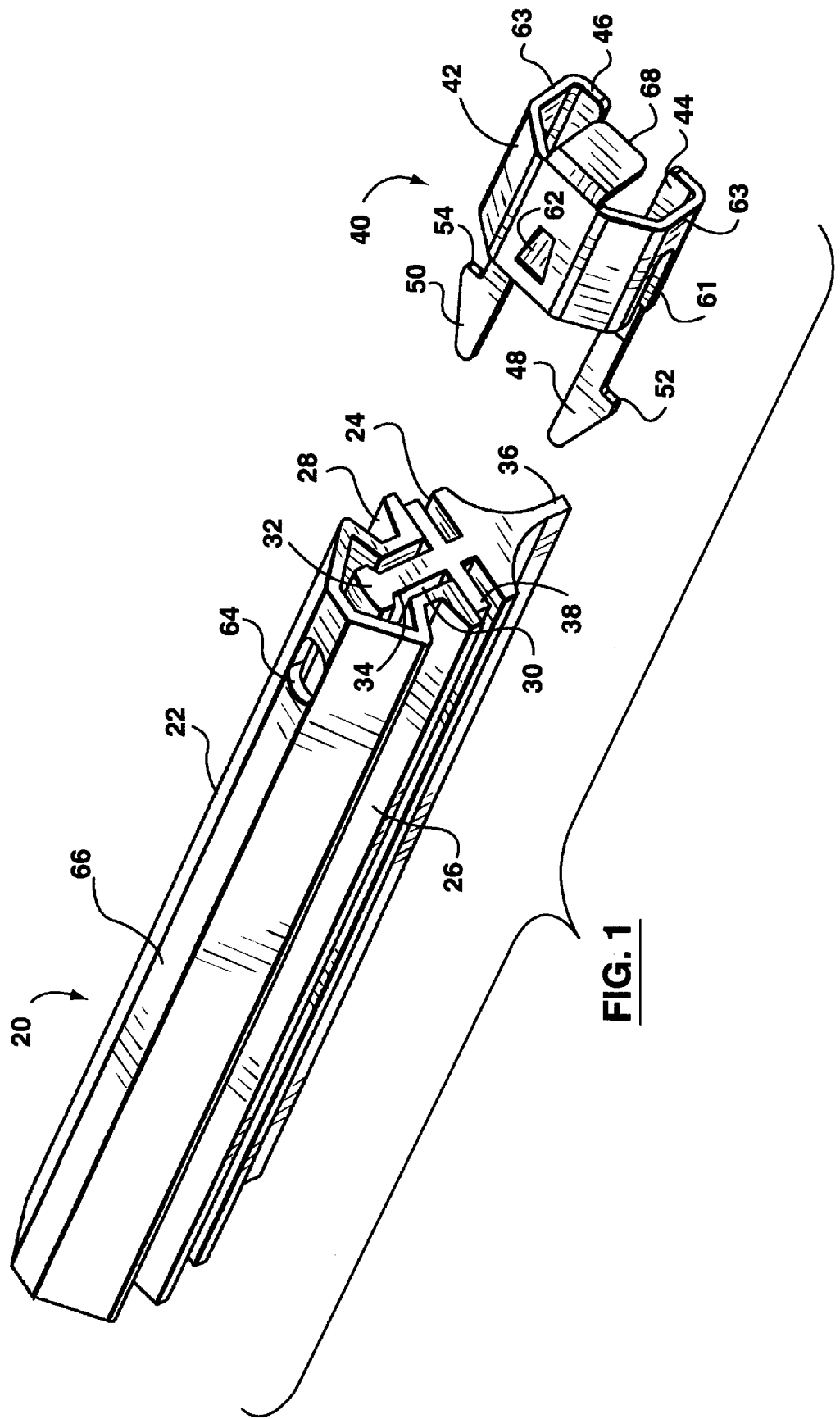
FIG. 1 is a perspective assembly drawing showing a refill assembly and a retainer clip made in accordance with the invention.
Figure 2:
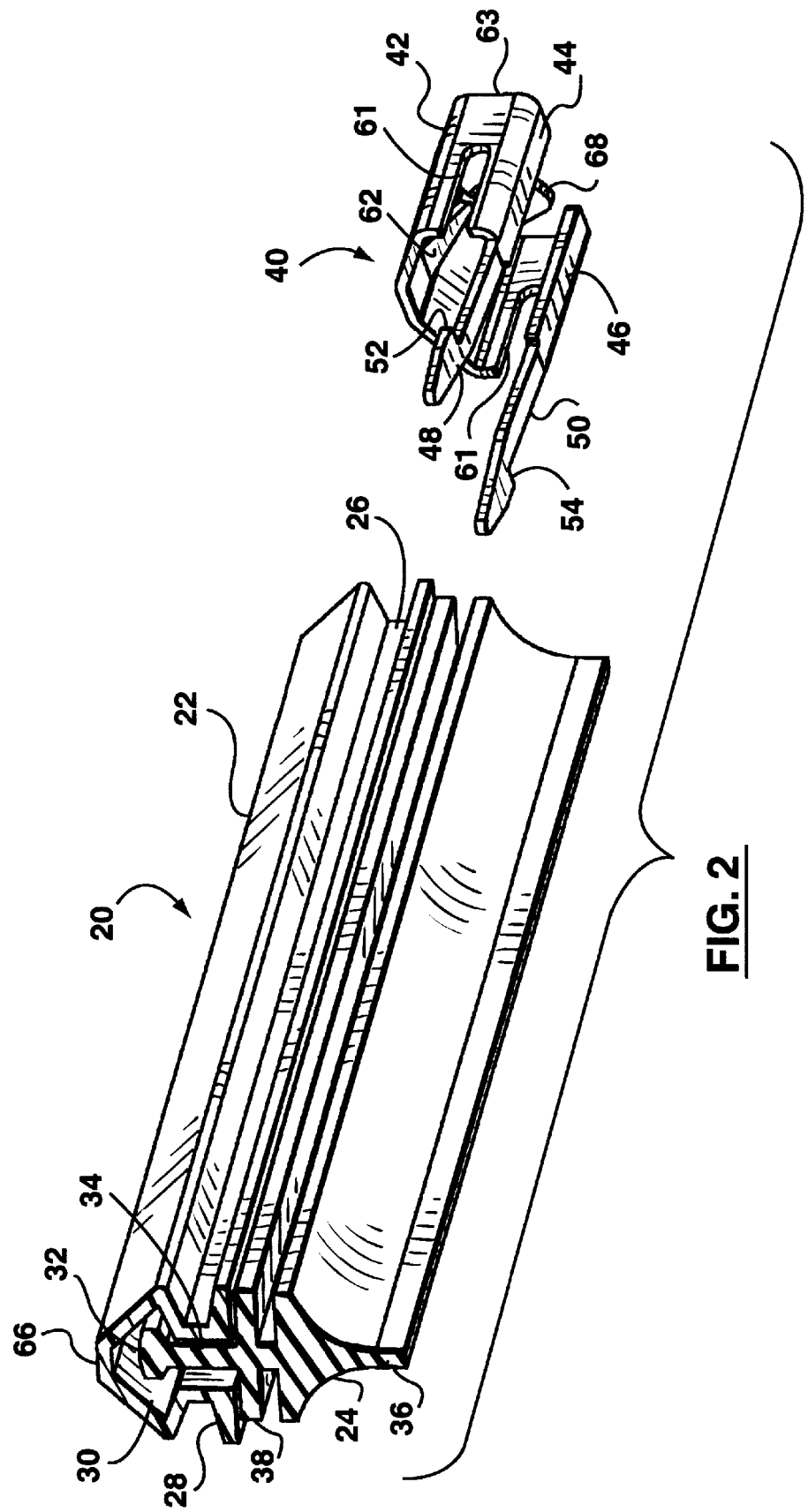
FIG. 2 is a similar view to FIG. 1 drawn from the opposite side.

A refill for a windshield wiper is generally indicated in FIG. 1 by reference numeral 20 and comprises a backing strip 22 and a squeegee 24. The backing strip 22 has a pair of longitudinally-extending grooves 26, 28 formed on opposite sides thereof and spaced from each other by downwardly extending open slot 30 centrally disposed between the grooves. The slot 30 widens at the top into a trigonal key-hole configuration and releasably retains the squeegee 24. The grooves are defined by upper and lower flange portions, of which the upper flange portions are coupled to each other by a connecting portion to close the slot and form said trigonal profile for the backing strip. A bead 32 for the squeegee locates in the top of the key-hole slot 30 while a narrow neck portion 34 of the squeegee extends through the slot between the grooves 28, 30. The squeegee terminates in a trigonal portion defining a wiping lip 36 and a transversely-extending stabilizer 38 locates underneath the grooves 26, 28 of the backing strip 22 and is spaced from the trigonal portion in conventional fashion.

A retainer clip generally indicated by reference numeral 40 and made in accordance with the invention is associated with a free end of the windshield wiper refill 20. The clip 40 comprises a hollow metal body 42 comprised of a pair of spaced, substantially parallel side wall portions 63 which have upper and lower longitudinal edge regions and an upper wall section joining said upper edge regions such that the body extends in a transverse direction between the grooves 26, 28 and extends over the slot 30 to form a cap that receives the backing strip 22. The profile of the body 42 generally matches that of the backing strip 22 so that the backing strip will nest inside the clip 40.

Figure 3:
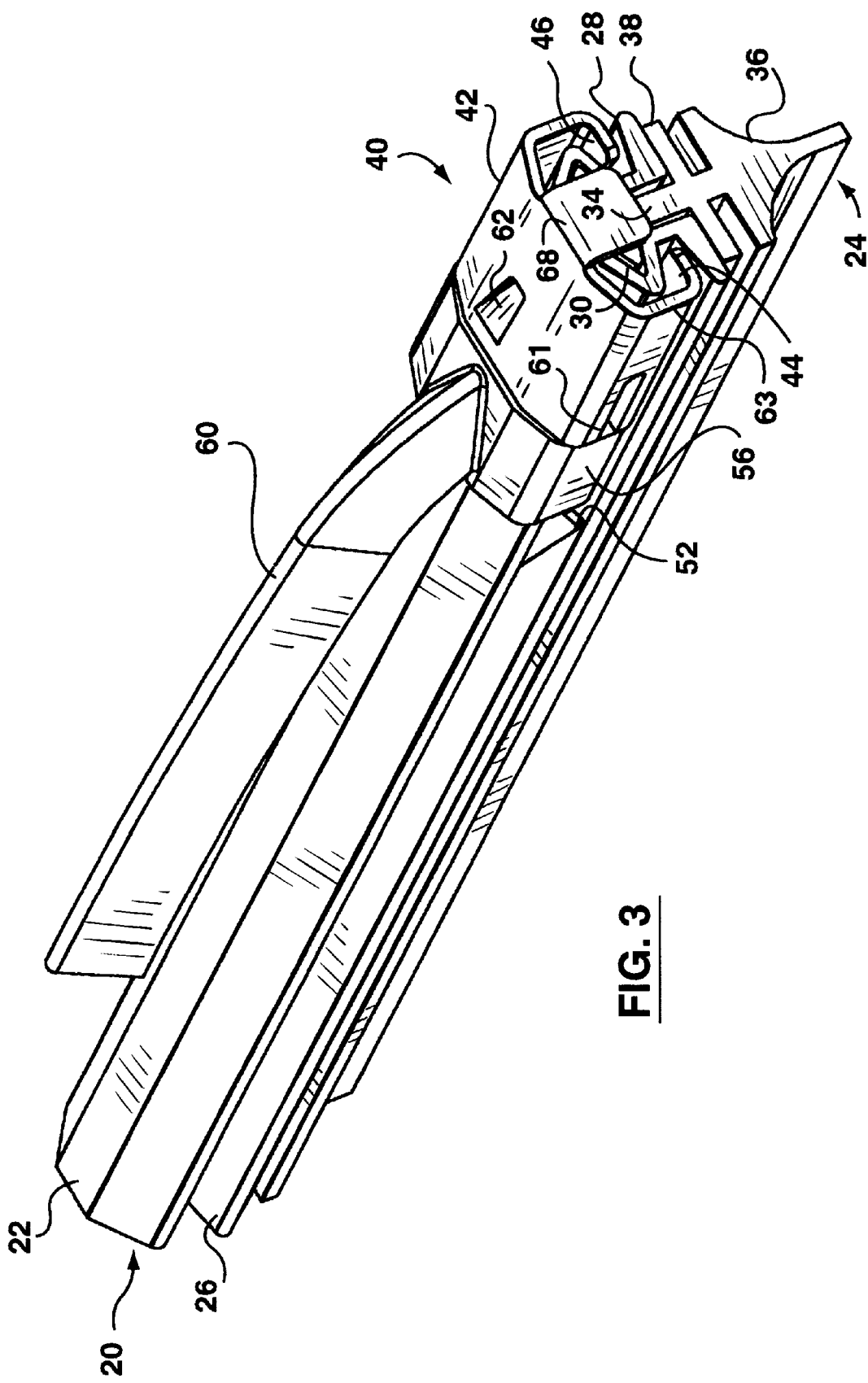
FIG. 3 is a perspective view similar to FIG. 1 showing a portion of the wiper superstructure and the retainer clip fully assembled on the refill assembly.

The body 42 has a pair of oppositely-directed elongate flanges 44, 46 formed integrally with the body and extending inwardly in the same plane from the lower edge regions to locate inside the grooves 26, 28 of the backing strip. A pair of legs 48, 50 each extending from a respective flange 44, 46 at one end thereof in a longitudinal direction and in the same plane as the flange similarly locate in the grooves 26, 28 and each terminates in a respective outwardly directed detent or latch portion 52, 54 for locating oppositely-disposed claws 56 of a wiper superstructure 60 (FIG. 3). The latch portions 52, 54 have outwardly-sloping surfaces or cam portions to facilitate assembly with the superstructure and the legs 48, 50 are adapted to flex toward each other to allow the claws 56 to clear the retainer clip 40 during such assembly.

The body 42 itself has a pair of open slots 61 formed in the upstanding wall portions 63 and extending from an intermediate portion of the body 42 towards the latch portions 52, 54 on respective sides of the body. The slots 61 give the retainer clip 40 some flexibility to accommodate dimensional variations in the underlying backing strip 22 and also lighten the overall structure.

A dart 62 is punched from the body 42 and penetrates into an aperture 64 formed in a web portion 66 of the backing strip 22 which joins the grooves 26, 28. The dart 62 secures the retainer clip 40 to the backing strip 22 so that they do not become separated.

A single tab 68 extends orthogonally from the body 42 in a downward direction and obstructs the slot 30 so as to block movement of the squeegee 24 out of the slot 30 at that end of the wiper.

Figure 4:
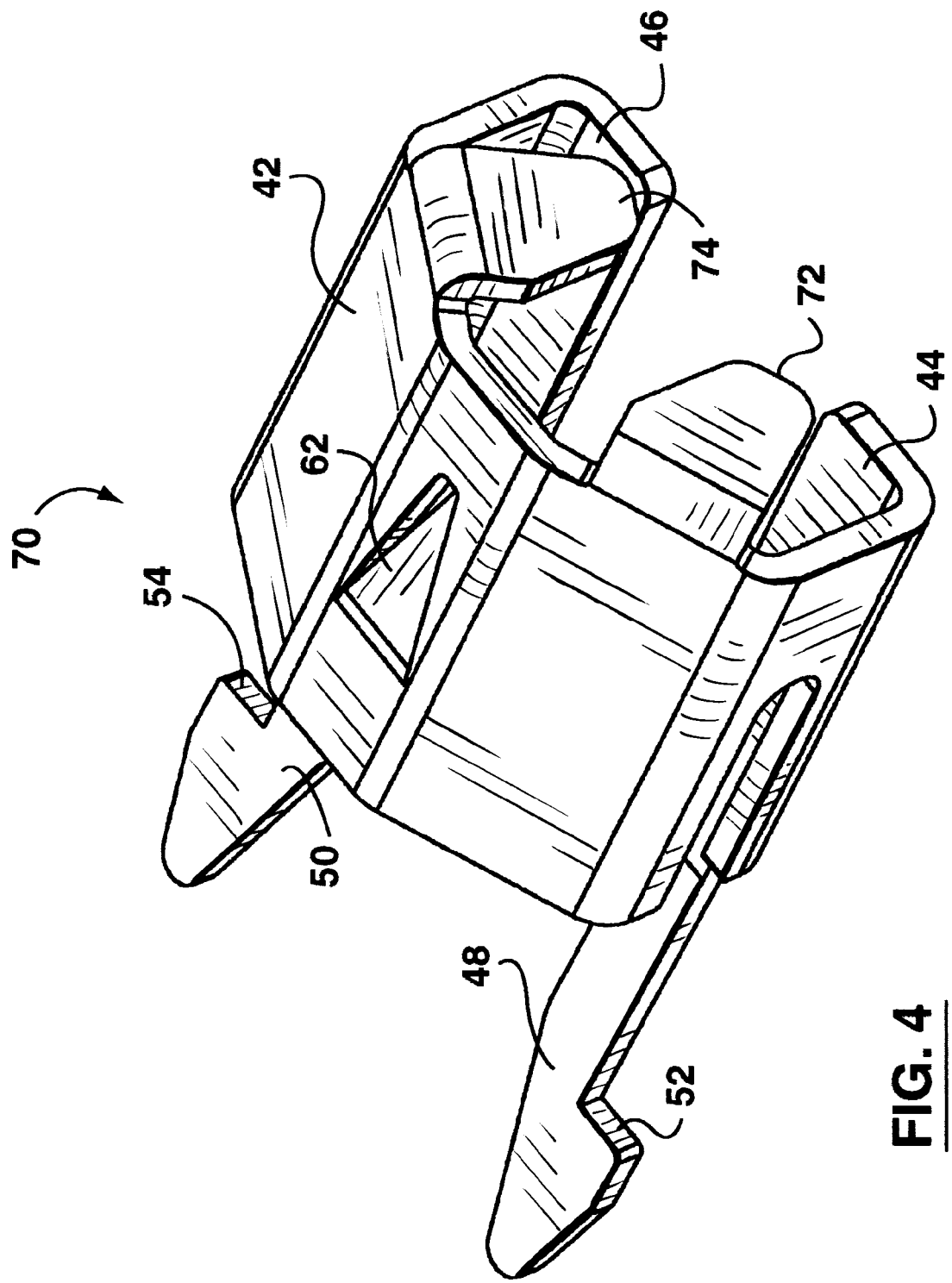
FIG. 4 (drawn to a larger scale) is a perspective view of a first alternative embodiment of the retainer clip made in accordance with the invention.

In a first alternative embodiment 70 of the retainer clip drawn in FIG. 4, a pair of orthogonal tabs 72, 74 are formed with the body 42 and extend both downwardly and transversely to obstruct the slot 30.

Figure 5:
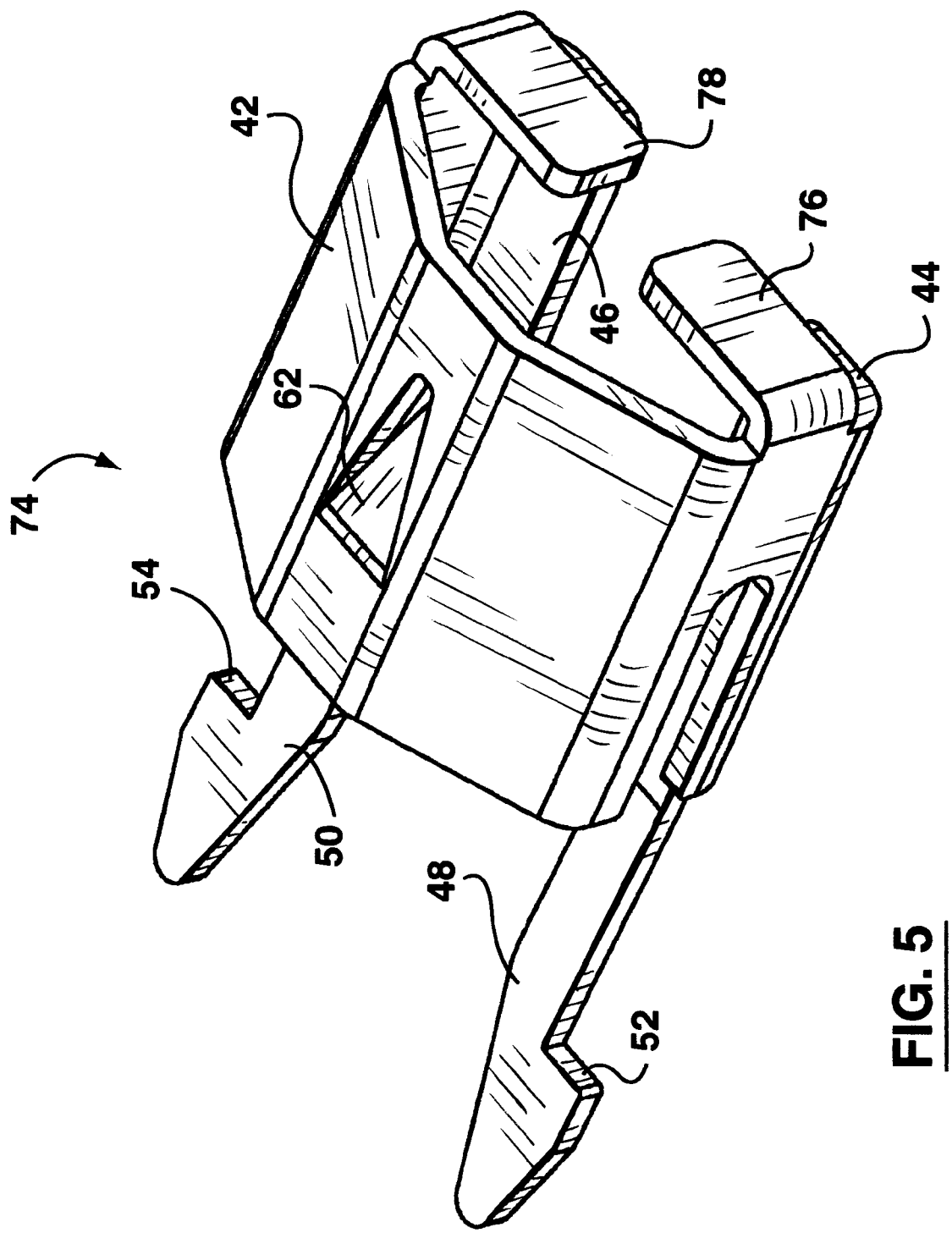
FIG. 5 (drawn to a larger scale) is a perspective view of a second alternative embodiment of the retainer clip made in accordance with the invention

In a second alternative embodiment 76 of the retainer clip drawn in FIG. 5, orthogonal tabs 78, 80 are formed with the body 42 to extend transversely to the legs 48, 50 and obstruct the slot 30.

In use, the backing strip and squeegee of a windshield wiper refill 20 would be assembled, the clip, 40, 70, 74, according to the invention, would be inserted over one end of the refill and a wiper superstructure 60 would have its claws 56 inserted into the grooves 26, 28 of the backing strip 22 at the other end of the refill 20 and the superstructure would slide along the grooves until the end claws locate in the detents 52, 54 of the retainer clip.

It will be appreciated that the completed assembly is very stable since the claws 56 are held captive inside the grooves 26, 28 of the backing strip 22 and that positive retention of the retainer clip on the refill is accomplished by encapsulating the backing strip in the body of the clip, thereby greatly facilitating assembly.

As will be apparent to those skilled in the art, several variations may be made to the invention within the scope of the appended claims.

We claim:

1. A retainer clip for locating the claws of a windshield wiper superstructure on a backing strip, the backing strip having a pair of longitudinally-extending grooves formed on opposite sides of a downwardly extending slot defining a longitudinal axis and receiving a squeegee, the grooves being defined by upper and lower flange portions connected at an inner end thereof, a connecting portion coupling the upper flange portions to each other and closing said slot at a top end thereof, the retainer clip comprising:

a hollow body comprised of a pair of spaced, substantially parallel side wall portions which have upper and lower longitudinal edge regions and an upper wall section joining said upper regions, said body adapted to receive a free end of the backing strip and profiled to extend in a transverse direction from a first of said grooves across said connecting portion to a second of said grooves with said connecting portion received between said hollow body and said squeegee;

a pair of oppositely-directed elongated flanges formed integrally with said body, the flanges extending laterally inwardly from a respective lower edge region toward said longitudinal axis and lying in the same plane, each flange being adapted to locate in a respective groove of the backing strip; and a pair of legs integrally formed with said flanges, each leg extending from a respective flange at one end thereof in a longitudinal direction and lying in the same plane as the flanges, the legs being adapted for location in a respective one of said grooves, the legs having respective latch portions outwardly directed away from said longitudinal axis and longitudinally spaced from the hollow body, each latch portion being adapted to locate a claw termination of a windshield wiper superstructure when slidably received in a respective groove of the backing strip, said legs being adapted to flex toward one another for location between the claw termination and the backing strip.

2. A retainer clip in accordance with claim 1 in which the hollow body has an inner end proximate to said latch portions and an outer end remote from said latch portions, the hollow body having an integrally-formed dart portion intermediate said inner end and said outer end which is adapted to bear against an underlying web of a backing strip.

3. A retainer clip in accordance with claim 1 in which the hollow body has an inner end proximate to said latch portions and an outer end remote from said latch portions, the hollow body having at least one integrally-formed tab orthogonal to said outer end and adapted to obstruct said slot at said free end of the backing strip so as to block movement of the squeegee.

4. A backing strip assembly for a windshield wiper, comprising:

a backing strip having a pair of longitudinally-extending grooves formed on opposite sides of a downwardly-extending slot defining a longitudinal axis, the grooves being defined by upper and lower flange portions connected at an inner end thereof, a connecting portion coupling the upper flange portions to each other and dosing said slot at one end;

a squeegee slidably received in said slot, and a retainer clip comprising a hollow body receiving a free end of the backing strip and profiled to extend in a transverse direction from a first of said grooves across said connecting portion to a second of said grooves, with said connecting portion received between said hollow body and said squeegee, the hollow body having a pair of oppositely directed elongated flanges formed integrally with the body and extending inwardly toward said longitudinal axis, lying in the same plane and located in a respective groove of the backing strip, and a pair of legs integrally formed with said flanges, each leg extending from a respective flange of the hollow body at one end thereof in a longitudinal direction and lying in the same plane as the flanges, each leg being located in a respective one of said grooves and having respective latch portions outwardly directed away from said longitudinal axis and longitudinally spaced from the hollow body, each latch portion being adapted to locate a claw termination of a windshield wiper superstructure when slidably received in a respective groove of the backing strip, said legs being adapted to flex toward one another for location between the claw termination and the backing strip.

5. A backing strip assembly in accordance with claim 4 in which the hollow body has an inner end proximate to said latch portions and an outer end remote from said latch portions, the hollow body having an integrally-formed dart portion intermediate said inner end and said outer end which is adapted to bear against an underlying web of the backing strip.

6. A backing strip assembly in accordance with claim 4 in which the hollow body has an inner end proximate to said latch portions and an outer end remote from said latch portions, the hollow body having at least one integrally-formed tab orthogonal to said outer end and adapted to obstruct said slot at said free end of the backing strip so as to block movement of the squeegee.

* * * * *